US006304383B1

(12) United States Patent
DeBoynton et al.

(10) Patent No.: US 6,304,383 B1
(45) Date of Patent: Oct. 16, 2001

(54) CONTROLLED STRESS THERMAL COMPENSATION FOR FILTERS

(75) Inventors: William L. DeBoynton, Santa Ana, CA (US); Kurt R. Francis, Yuma, AZ (US); Scott M. Hellman, Aliso Viejo; Michael Uschitsky, Irvine, both of CA (US); Peter G. Wigley, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/398,647

(22) Filed: Sep. 17, 1999

(51) Int. Cl.$^7$ .............................. G02B 27/00; G02B 1/00
(52) U.S. Cl. ......................... 359/579; 359/578; 359/582; 359/900
(58) Field of Search ................................... 359/578, 579, 359/582, 290, 820, 848, 900

(56) References Cited

U.S. PATENT DOCUMENTS 3,459,467 * 8/1969 Kantor .................................. 359/579
3,666,351 * 5/1972 Pao ...................................... 359/579

(List continued on next page.)

FOREIGN PATENT DOCUMENTS

| 2158017 | 6/1973 | (FR) . |
| 2758631 | 7/1998 | (FR) . |
| 2295029 | 5/1996 | (GB) . |

OTHER PUBLICATIONS

C.M. Miller and F. J. Janniello, "Passively Temperature–Compensated Fibre Fabry–Perit Filter and its Application . . . " Electronics Lett. vol. 26, No. 25, pp. 2122–2123, Dec. 1990.*

"Deformation of Optical Surfaces by Film Stress by Richard J. Scheuerman", Journal of Vacuum Science and Technology, vol. 6, No. 1, p. 145–147, Aug. 7, 1968.

"On the Theory of Thermal Stresses in a Thin Bonding Layer"by Cherepanov, Journal Applied Physics, vol. 78, No. 11, p. 6826–6832, Dec. 1, 1995.

*Primary Examiner*—Cassandra Spyrou
*Assistant Examiner*—John Juba, Jr.
(74) *Attorney, Agent, or Firm*—Eric M. Smith (57) ABSTRACT

A temperature compensated optical filter assembly including a plurality of thin films having temperature dependent indices of refraction which are deposited on a glass substrate so as to form a conventional interference filter thereon. The glass substrate is adhesively coupled to a metal holder such that the deposited thin film interference filter is interposed between the glass substrate and an adhesive layer distributed along a mounting surface of the holder. Thus, a first thermal mismatch stress is applied by the glass substrate onto an inner layer of the interference filter and a second mismatch stress is applied by the holder onto an outer layer of the interference filter, wherein the first and second mismatch stresses depend on the temperature of the filter assembly. The glass substrate, the adhesive, and the holder are preferably formed of materials having mechanical properties such that the first and second mismatch stresses compensate for the effects of the temperature dependent indices of refraction of the thin films so as to uniformly maintain the spectral performance of the filter assembly in response to a change in temperature. In one embodiment, an additional degree of freedom is obtained by electro/magneto-strictively prestressing the thin film stack during the formation thereof. In another embodiment, an active stress management system is utilized.

19 Claims, 5 Drawing Sheets

U.S. PATENT DOCUMENTS

| | | | |
|---|---|---|---|
| 4,147,413 | 4/1979 | Sims et al. | 359/820 |
| 4,240,696 * | 12/1980 | Tracey et al. | 359/578 |
| 4,786,128 | 11/1988 | Birnbach | 359/245 |
| 4,973,131 * | 11/1990 | Carnes | 356/506 |
| 5,005,947 | 4/1991 | Sibilo et al. | 359/819 |
| 5,035,495 * | 7/1991 | Toyoda et al. | 359/848 |
| 5,157,468 * | 10/1992 | Matsumoto | 372/34 |
| 5,212,584 * | 5/1993 | Chung | 359/579 |
| 5,289,552 * | 2/1994 | Miller et al. | 385/73 |
| 5,379,155 | 1/1995 | Goetschmann et al. | 359/820 |
| 5,384,877 * | 1/1995 | Stone | 385/27 |
| 5,471,721 * | 12/1995 | Haertling | 29/25.35 |
| 5,502,781 | 3/1996 | Li et al. | 385/4 |
| 5,604,629 | 2/1997 | Hunter et al. | 359/359 |
| 5,615,052 | 3/1997 | Doggett | 359/811 |
| 5,615,224 * | 3/1997 | Cohen | 372/36 |
| 5,859,717 * | 1/1999 | Scobey et al. | 385/24 |
| 5,879,820 | 3/1999 | Quesnel et al. | 428/688 |
| 5,923,471 | 7/1999 | Wood, II et al. | 359/584 |
| 5,930,046 | 7/1999 | Solberg et al. | 359/580 |
| 6,088,079 * | 7/2000 | Kameyama et al. | 349/185 |

* cited by examiner

CONTROLLED STRESS THERMAL COMPENSATION FOR FILTERS

BACKGROUND OF THE INVENTION

1. Field of the Invention

The present invention relates to optical filters and, in particular, relates to temperature compensated optical filter assemblies having a thin film interference filter subassembly deposited therein.

2. Description of the Related Art

Optical filters are commonly used in science and industry to selectively attenuate optical signals according to frequency. For example, communication systems which transmit multiplexed optical signals having a plurality of frequency components along a single optical fiber often rely on optical filters to demultiplex the transmitted signal. In particular, an optical filter adapted to substantially attenuate or reflect all but a narrow frequency band, commonly known as a band pass filter, allows the corresponding frequency component to be isolated from the transmitted optical signal so that the information carried by the isolated frequency component can be subsequently processed in a non-interfering manner.

A typical optical filter assembly comprises a glass substrate, an interference filter deposited on the glass substrate and a holder that supports the substrate. In particular, the glass substrate structurally supports the interference filter, which comprises a plurality of thin films deposited in a layered manner over a surface of the glass substrate. Furthermore, the holder couples with another surface of the glass substrate, wherein the two surfaces are on opposite sides.

When an input broadband optical signal is directed so as to be incident upon the interference filter, the interference filter selectively attenuates the signal by exploiting the well known principles of reflection, refraction, and interference. In particular, the input signal is initially subdivided into multiple broadband constituents as the signal undergoes reflection and refraction at each layer of the interference filter. Thus, each constituent travels along a unique optical path length, defined hereinbelow as the product of the physical path length times the index of refraction of the refractive medium, so that the frequency components of each constituent undergo frequency dependent phase changes. Furthermore, after traveling through the varying optical path lengths within the refracting medium of the filter, the subdivided constituents that eventually exit the rear layer recombine in an interfering manner to produce a transmitted filtered output signal. Likewise, the light energy that exits the front layer recombines to form a reflected filtered output signal.

Thus, the filtering aspects are determined by the thickness and index of refraction of each of the thin films of the interference filter, and the incident angle of the input signal with respect to the interference filter. Consequently, the interference filter may be adapted to perform virtually any specific filtering operation, such as band pass filtering or band rejection filtering, using appropriately dimensioned thin films having appropriate refractive indices. Moreover, the interference filter may operate both as a reflecting device as well as a transmitting device such that the reflected and transmitted signals are complementary to each other.

However, known optical filter assemblies are often sensitive to a change in temperature. In particular, because variations in temperature alter the properties of the thin films, the indices of refraction and the thicknesses of the thin films typically vary in response to a change in temperature. Furthermore, because the glass substrate and the interference filter usually have different coefficients of thermal expansion, the glass substrate usually exerts a thermal mismatch stress onto the deposited thin films that often causes the thin films to experience further temperature dependent changes in thickness. Thus, because the filtering characteristics depend on the indices of refraction and thicknesses of the thin films, a change in temperature often changes the filtering characteristics of the filter.

Consequently, known filter assemblies having substantial temperature dependencies may limit the performance of optical systems that rely on such devices. In particular, the temperature dependent filtering characteristics of known filter assemblies may limit their ability to consistently transmit one signal having a first frequency range while consistently attenuating or reflecting another signal having a second frequency range. Because these devices are often placed in environments having substantially changing temperature conditions, substantial allowances may be required in the design of optical systems that utilize such devices to compensate for the foregoing temperature dependency.

For example, in the case of the multiplexed fiber optic communications system mentioned above, the required frequency spacing between each of the frequency components of the transmitted signal may need to be relatively large so as to accommodate the temperature dependent spectral performance of the filter assembly. Because the maximum number of simultaneous signals that can be transmitted along a single optical fiber is directly related to the minimum frequency spacing, the temperature dependent filter assembly will likely limit the number of simultaneous signals that can be transmitted through the fiber optic cable.

The typical solution used in the industry to reduce the forgoing problem of temperature dependency is to deposit the interference filter on a compensating glass substrate. In particular, the material of the glass substrate is chosen so that the thermal mismatch stress exerted by the substrate onto the thin films induces the thicknesses of the thin films to change such that the filtering characteristics of the filter have a reduced sensitivity to a change in temperature. However, although this approach can be used to reduce the thermal dependency of the filtering characteristics, substantial thermal dependencies often remain. Furthermore, because the compensating glass substrate is typically formed of relatively expensive glass materials, such optical filters are relatively expensive to produce.

Therefore, from the foregoing, it will be appreciated that there is a need for an optical filter assembly having a spectral response that is less affected by a change in temperature. To this end, there is a need for an optical filter assembly that is able to further reduce thermally induced changes in the optical pathlengths of the filter. Furthermore, there is a need for the device to be constructed in a simple manner so that it can be inexpensively produced. Moreover, there is a need for the device to be formed with a small size so as to be usable in space constrained fiber optic systems.

SUMMARY OF THE INVENTION

The aforementioned needs are satisfied by the optical apparatus of the present invention. According to one aspect of the invention, the optical apparatus comprises an optically transmissive substrate, a holder, and an interference filter deposited on a surface of the substrate and bonded to a surface of the holder. Where, the substrate and holder each have different coefficients of thermal expansion selected to apply compensating stresses on said filter over a range of temperatures. In one embodiment, the holder and filter are bonded together by an adhesive, said adhesive partially isolating said filter from stresses caused by thermally induced dimensional changes of the holder. In another embodiment, the filter is comprised of layers of electro/magneto-strictive material.

Another aspect of the invention includes an optical apparatus comprising an input port for receiving light along a light path and an interference filter comprised of layers of electro/magneto-strictive material. The filter is disposed in said path such that light impinges on said layers. An electric/magnetic field generator is further included for applying an electric/magnetic field to said material. Preferably, a controller is included for controlling the electric/magnetic field generator.

Yet another aspect of the invention comprises a method of stabilizing the filtering characteristics of an interference filter. The method comprises applying plural thermally dependent stresses to said interference filter so as to reduce the deviation of said interference filter from a desired filtering characteristic in response to a change in temperature.

In one embodiment, the method of stabilizing the filtering characteristics of an interference filter further comprises creating the plural stresses mechanically. In another embodiment, the method further comprises creating at least one of the plural stresses utilizing an electric/magnetic field.

The optical apparatus of the preferred embodiments filters an input optical signal such that the filtering characteristics are substantially unaffected by a changing temperature. These and other advantages of the preferred embodiments will become more apparent from the following description taken in conjunction with the accompanying drawings.

DETAILED DESCRIPTION OF THE PREFERRED EMBODIMENT

Figure 1A:
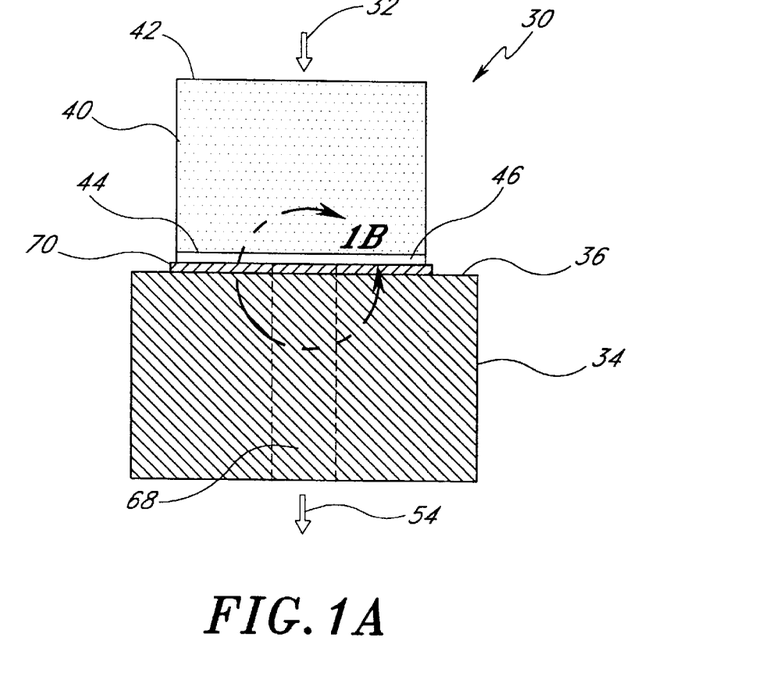
FIG. 1A is a side elevation view of a temperature compensated filter assembly of an embodiment of the present invention.

Reference will now be made to the drawings wherein like numerals refer to like parts throughout. In particular, FIG. 1A illustrates an optical apparatus 30 that provides improved filtering characteristics in response to a changing temperature. Specifically, the apparatus 30 selectively attenuates an input optical signal 32 according to a frequency dependent attenuation curve such that the attenuation curve remains substantially unchanged while the apparatus 30 undergoes a change in temperature. As will be described in greater detail below, improved thermal compensation is provided by the application of a first and second thermal mismatch stress on an interference filter 46 of the optical apparatus 30.

As shown in FIG. 1A, the optical apparatus 30 comprises a holder 34 having a mounting surface 36, an optically transmissive substrate 40 having opposed first and second surfaces 42 and 44, and an interference filter 46 interposed between the substrate 40 and the holder 34. The first surface 42 of the substrate 40 acts as an input port such that light entering therein is selectively attenuated by the optical apparatus 30. The interference filter 46, which provides a substantial portion of the filtering capabilities of the optical apparatus 30, is deposited on the second surface 44 of the substrate 40 and adhesively bonded to the mounting surface 36 of the holder 34 so as to couple the substrate 40 with the holder 34. Thus, as will be described in greater detail below, the temperature dependent first and second thermal mismatch stresses are respectively exerted on the interference filter from the substrate 40 and from the holder 34.

As shown in FIG. 1A, the optical apparatus 30 is preferably positioned so as to receive the input optical signal 32 at the first surface 42 of the substrate 40 such that the input signal 32 impinges on the first surface 42 along a path substantially perpendicular to the surface 42. The input signal 32 then passes through the substrate 40 and exits the substrate 40 at the second surface 44. The input signal 32 then enters the interference filter 46, wherein the input signal 32 is converted into a reflected output signal (not shown) that returns into the substrate 40 and a transmitted output signal 54 that exits away from the substrate 40.

However, it will be appreciated that the optical apparatus 30 would function in a similar manner if it were rotated by 180 degrees. In particular, the optical apparatus 30 could be positioned so that an input optical signal having a direction opposed to that of the input signal 32 of FIG. 1A impinges directly on the interference filter 46 prior to entering the substrate 40. Thus, in this alternative configuration, a reflected output signal would be directed away from the substrate 40 and a transmitted output signal would enter the substrate 40.

As shown in FIG. 1A, the holder 34 is formed with an opening 68 which extends from the mounting surface 36 so as to enable the output signal 54 to pass therethrough, as indicated by the dashed lines in FIG. 1A. Moreover, the holder 34 may be pivotally mounted to any suitable mounting structure so as to provide a method of adjusting the frequency response of the optical apparatus 30.

Figure 1B:
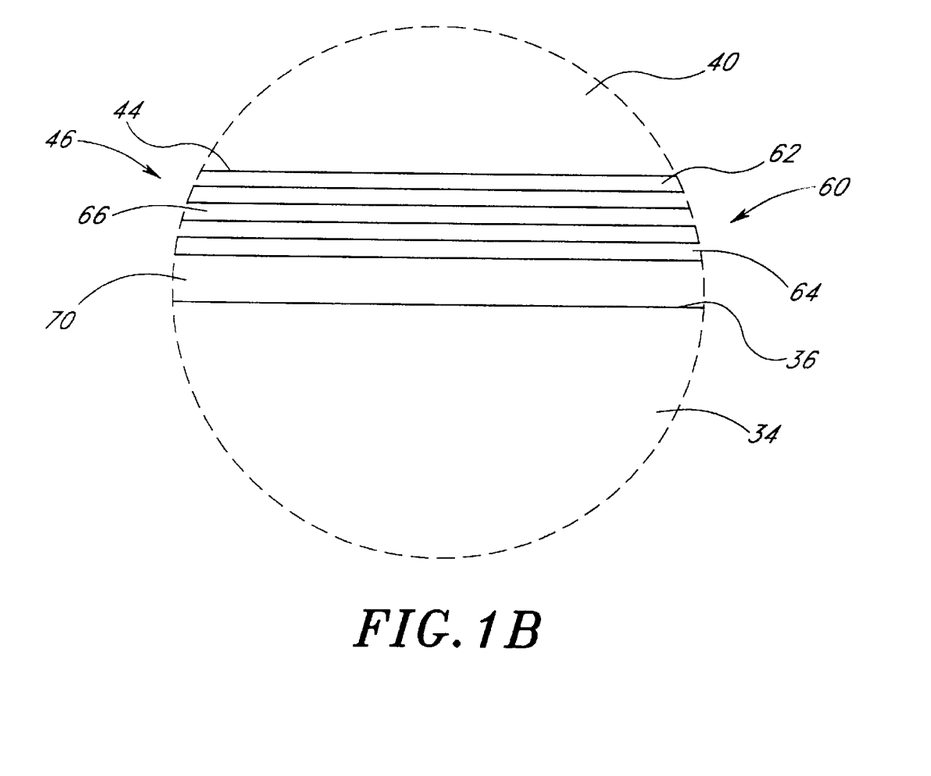
FIG. 1B is a magnified view of the filter assembly of FIG. 1A.

As shown in FIG. 1B, the interference filter 46 is comprised of a plurality of optically transmissive thin film layers 60 deposited over the optically transmissive substrate 40 in a manner known in the art. In particular, the plurality of thin film layers 60 includes a front film layer 62 deposited on the second surface 44 of the substrate 40, a rear film layer 64 deposited distally from the front layer 62, and inner film layers 66 deposited therebetween. Moreover, since the substrate 40 and filter 46 have different coefficients of thermal expansion, the first thermal mismatch stress is exerted by the substrate 40 onto the front layer of the filter 62.

As shown in FIGS. 1A and 1B, an adhesive layer 70 is flushly interposed between the rear layer 64 of the interference filter 46 and the mounting surface 36 of the holder 34. In particular, the adhesive layer 70 is chosen so as to securely couple the interference filter 46 with the holder 34. Thus, since the thermal coefficient of expansion of the holder 34 is different from that of the filter 46. the holder 34, indirectly, exerts the second thermal mismatch stress onto the rear layer 64 of the filter 46 through the adhesive 70.

As mentioned previously, some prior art interference filters realize a degree of temperature compensation by adapting a single thermal mismatch stress applied by a supporting substrate onto the filter so that thermally induced changes in the optical pathlengths of the filter are reduced. However, this requires that the substrate be formed of material having a narrowly defined thermal coefficient of expansion. Thus, this method often results in insufficient temperature compensation and often requires the substrate to be formed of relatively expensive material.

However, in the preferred embodiment, improved thermal compensation is realized by applying the second mismatch stress in combination with the first mismatch stress. In particular, the apparatus 30 is adapted so that the second mismatch stress further modifies the thicknesses of the films 60 of the filter 46 so as to further reduce thermally induced changes in the optical pathlengths of the films 60. Thus, the additional degree of freedom provided by the second stress allows the apparatus 30 to be formed from materials having less narrowly defined thermal coefficients of expansion, thereby enabling the apparatus 30 to be constructed at a reduced cost.

In one embodiment, the holder 34 is formed of material having a thermal coefficient of expansion that provides the holder 34 with an appropriate dimensional change in response to a change in temperature. Furthermore, since the second stress is developed through the adhesive 70, the physical dimensions and elastic properties of the adhesive 70 also determine the magnitude of the second stress. Thus, for example, a highly elastic thick adhesive 70 would result in a relatively small second stress being applied on the filter 46, whereas a non-elastic thin adhesive 70 would result in a relatively large second stress. Therefore, by forming the holder 34 with the appropriate thermal coefficient of expansion and by forming the adhesive 70 with an appropriate thickness and elastic modulus, the holder 34 can be adapted to develop the second stress onto the filter 46 through the adhesive 70 so that the thermally induced variations in the filtering characteristics of the filter 46 are relatively small. Thus, since the second stress is defined by the combination of the coefficient of thermal expansion of the holder 34 and the physical dimensions and elastic properties of the adhesive 70, the second stress can be developed with a temperature dependent magnitude that falls within a substantially large range of values.

In one embodiment of the optical apparatus 30 of FIG. 1A, the substrate 40 is poorly matched with the interference filter 46. In particular, the substrate 40 exerts the first stress onto the interference filter so as to adversely affect the interference filter in response to a change in temperature. However, in this embodiment, the holder 34 and the adhesive 70 are adapted so that they develop the second stress in such a way as to counteract the effects of the first stress.

In another embodiment, an additional method of stress compensation is utilized. In particular, inherent restrictive properties of some filter materials are exploited so as to provide an additional degree of freedom in the effort to regulate the filtering characteristics of the optical apparatus. Specifically, it is well known in the art that some materials exhibit restrictive properties such that the dimensions of these materials may be altered when exposed to an appropriate field. For example, electro-strictive materials are affected by an externally applied electric field whereas magneto-strictive materials are affected by an externally applied magnetic field.

In this application, electro/magneto-strictive materials are referred to hereinbelow as those materials that exhibit electro-strictive properties and those materials that exhibit magneto-strictive properties. Furthermore, an electric/magnetic field is referred to hereinbelow as an electric field, in the case that the electro-strictive properties are exploited, or a magnetic field, in the case that the magneto-strictive properties are exploited.

Since it has been determined that some refractive materials exhibit electro/magneto-strictive properties, it is possible to form an interference filter from such materials. Thus, as will be described in greater detail below, such an interference filter can be adapted with filtering characteristics that are influenced by an externally applied electric/magnetic field.

Figure 2:
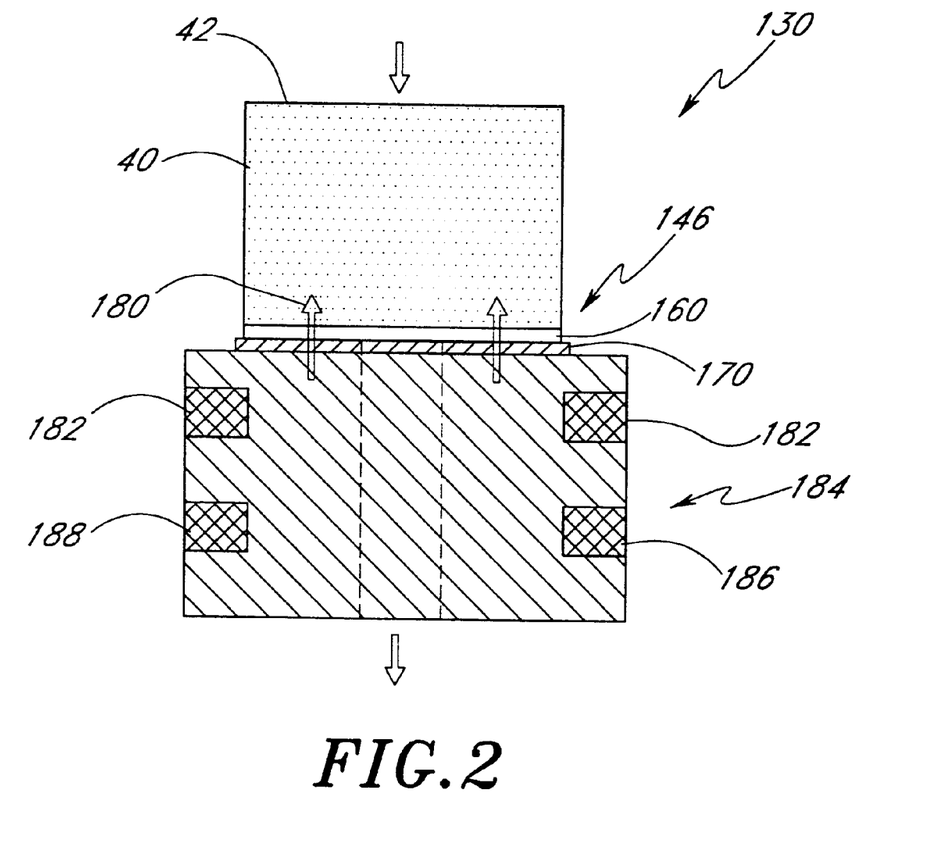
FIG. 2 is a side elevation view of a filter assembly of an embodiment of the present invention that utilizes electro/magneto-strictive materials.

Reference will now be made to FIG. 2, which generally illustrates one embodiment of an optical apparatus 130 that utilizes electro/magneto-strictive materials, such as electro/magneto-strictive oxides, to further regulate its filtering characteristics. In particular, the optical apparatus 130 is substantially similar to the optical apparatus 30 of FIG. 1A except that layers 160 of an interference filter 146 are formed of electro/magneto-strictive oxide material.

In one embodiment, an adhesive 170 is prestressed during the formation of the optical apparatus 130. In particular, subsequent to the formation of the interference filter 146, the interference filter 146 is exposed to a suitable electric/magnetic field so as to modify the elongated dimensions of the interference filter 146. The adhesive layer 170 is then deposited and cured in a UV process. The electric/magnetic field is then removed so that the elongated dimensions of the interference filter 146 substantially return to their initial values. Thus, the adhesive 170 experiences a corresponding dimensional change that results in the adhesive 170 being prestressed.

In one embodiment, the filter 146 is continuously exposed to an electric/magnetic field 180. In particular, the optical apparatus 130 further comprises an electric/magnetic field generator 182 that is adapted to produce the electric/magnetic field 180. Thus, in addition to the first and second mismatch stresses respectively applied by the substrate 40 and holder 134 onto the interference filter 146, the electro/magneto-strictively induced dimensional changes provide another compensating mechanism for thermally compensating the filter 146.

As indicated in FIG. 2, the electric/magnetic field generator 182 is preferably positioned within the holder 134. However, in another embodiment, the field generator 182 could be positioned at another location, provided that the electric/magnetic field generated therefrom is sufficient to effectively manipulate the electro/magneto-strictive interference filter 146. Furthermore, the electric/magnetic field generator 182 may comprise a plurality of charged plates so as to produce an appropriate electric field or a current carrying wire so as to produce an appropriate magnetic field.

In one embodiment, the optical apparatus further includes an active control system 184 that comprises a controller 186 and a temperature sensor 188 as indicated in FIG. 2. The controller 186 is adapted to control the electric/magnetic field generator 182 in a manner known in the art. Furthermore, the controller 186 is adapted to monitor the temperature sensor 188 so that the controller 186 can vary the electric/magnetic field in a temperature dependent manner so as to more effectively maintain uniform filtering characteristics.

Figure 3:
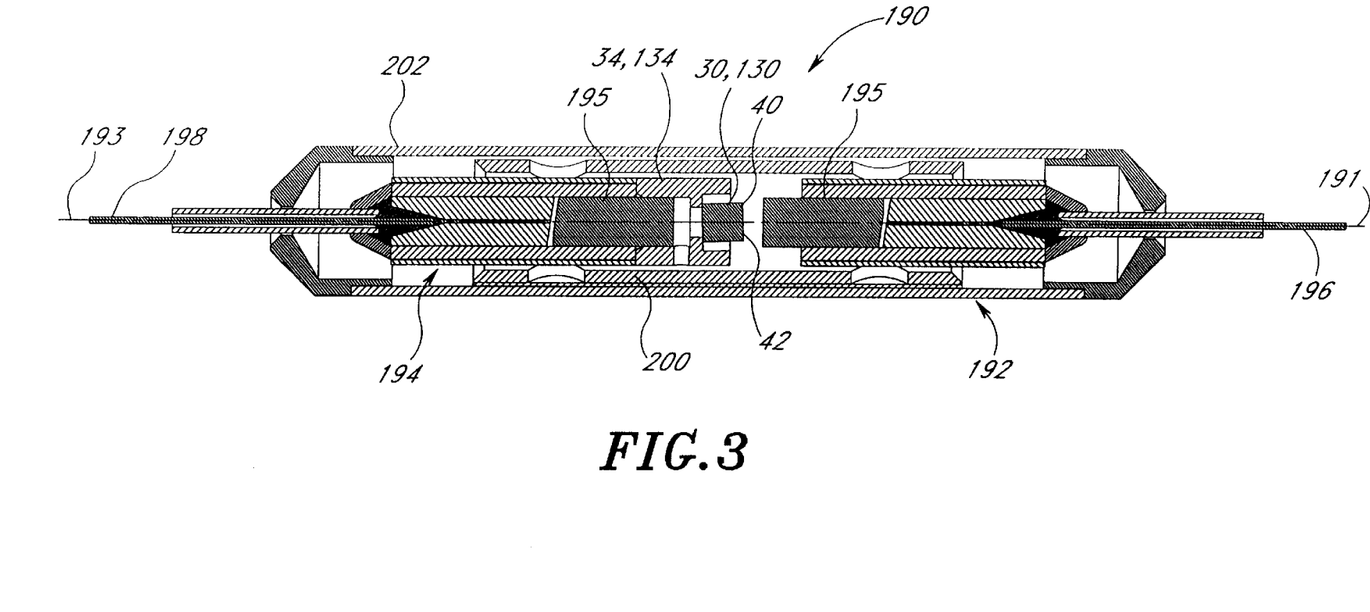
FIG. 3 is a side elevation view of a fiber optic junction assembly that utilizes the filter assemblies of FIGS. 1A and 2.

Reference will now be made to FIG. 3 which illustrates a thermally compensated fiber optic filter apparatus 190. In particular, the filter apparatus 190 may comprise either of the thermally compensated filter assemblies 30 and 130 of FIGS. 1 and 2 so as to enable an input signal 191 from a first optical fiber 196 to be reliably converted into a filtered output signal 193 which is transmitted along a second optical fiber 198.

As shown in FIG. 3, the apparatus 190 further comprises a first light guide 192 that optically couples with the first fiber 196 and a second light guide 194 that optically couples with the second fiber 198. The light guide 192 includes a graded index lens 195 that focuses the input signal 191 into a central region 199 of the apparatus 190. Furthermore, the light guide 194 includes a graded index lens 197 that focuses the output signal 193 as it exits the central region 199.

As shown in FIG. 3, the filter assembly 30, 130 is positioned in the central region 199 of the apparatus 190 so as to be interposed between the first and second light guides 192 and 194 so that the input signal 191 from the first fiber 196 is directed toward the filter assembly 30, 130. In particular, the holder 34, 134 is mounted to the second light guide 194 so that the first surface 42 of the substrate 40 faces the first light guide 192. Moreover, the transmitted output signal 193 from the filter assembly 30, 130 is directed through the second light guide 194 so that it continues into the second fiber 198.

As shown in FIG. 3, the apparatus 190 further comprises an inner housing member 200 and an outer housing member 202. The inner housing member 200 encloses the first and second light guides 192 and 194 so as to maintain the first and second light guides 192 and 194 in a preferred alignment. Furthermore, the outer housing member 202 encloses the inner housing member 200 as well as the terminating ends of the first and second fibers 196 and 198.

Figure 4:
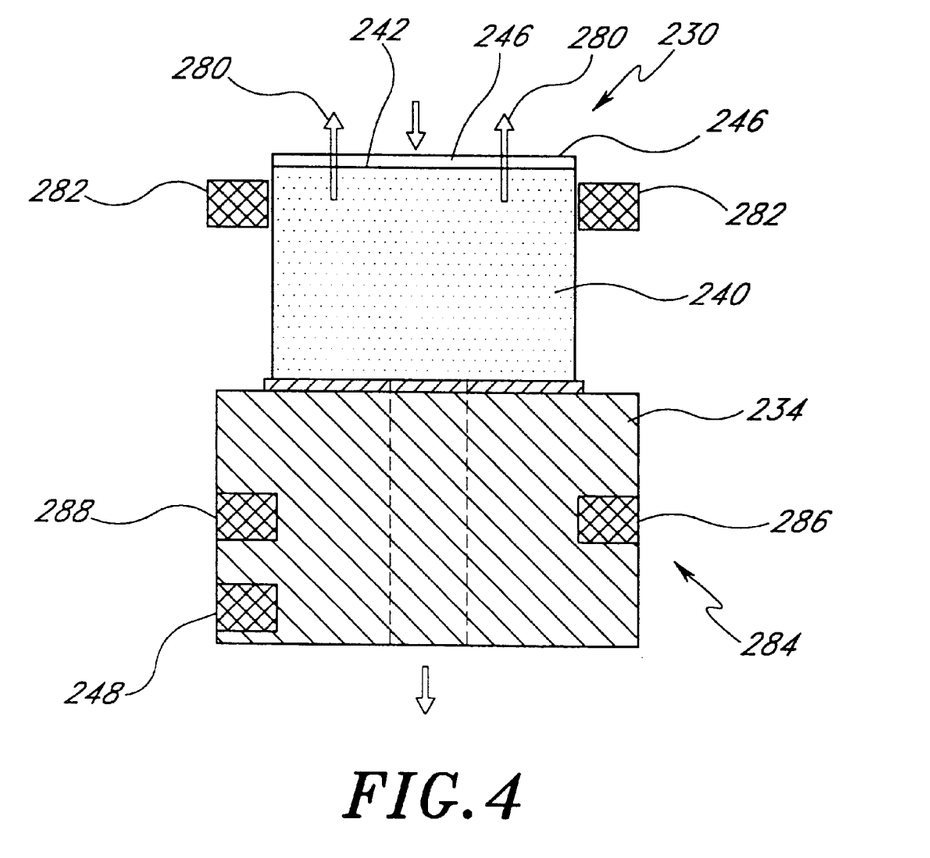
FIG. 4 is a side elevation view of a filter assembly of an embodiment of the present invention that includes an active stress management control system.

Reference will now be made to FIG. 4 which illustrates an embodiment of an optical apparatus 230. The optical apparatus 230 is substantially similar to the actively controlled optical apparatus 130 of FIG. 2 except that an interference filter 246 is deposited on a first surface 242 of a substrate 240 so as to be spaced from a holder 234. Furthermore, the electro/magneto-strictive induced stress mechanism and the first mismatch stress applied by the substrate 240 are combined as will be described in greater detail below.

In one embodiment, the optical apparatus 230 is adapted so that variations in the filtering characteristics in response to a change in temperature are relatively small. In particular, the controller 286 directs the electric/magnetic field generator 282 to modify the electric/magnetic field 280 so that the electro/magneto-strictive induced stress mechanism combines with the first thermal mismatch stress to thermally compensate the apparatus 230.

In another embodiment, the optical apparatus 230 is adapted with a control system 284 that enables the filtering characteristics to vary between a first filter characteristic and a second filter characteristic. In particular, the center wavelength can be adjusted between a first center wavelength and a second center wavelength, as will be described in greater detail below.

As indicated in FIG. 4, the control system 284 of the apparatus 230 is substantially similar to the control system 184 of FIG. 2. In particular, the control system 284 includes the controller 286 and the temperature sensor 288. Furthermore, the control system 284 of the optical apparatus 230 further comprises a user input device 248, such as a potentiometer. Moreover, the controller 286 is adapted to receive input from the user input device 248 so as to enable a user to change the filtering characteristics of the optical apparatus. Thus, according to the signal provided by the user input device 248, the controller 286 directs the electric/magnetic field generator 282 to modify the electric/magnetic field 280 that provides the interference filter 246 with the requested filter characteristic.

Figure 5:
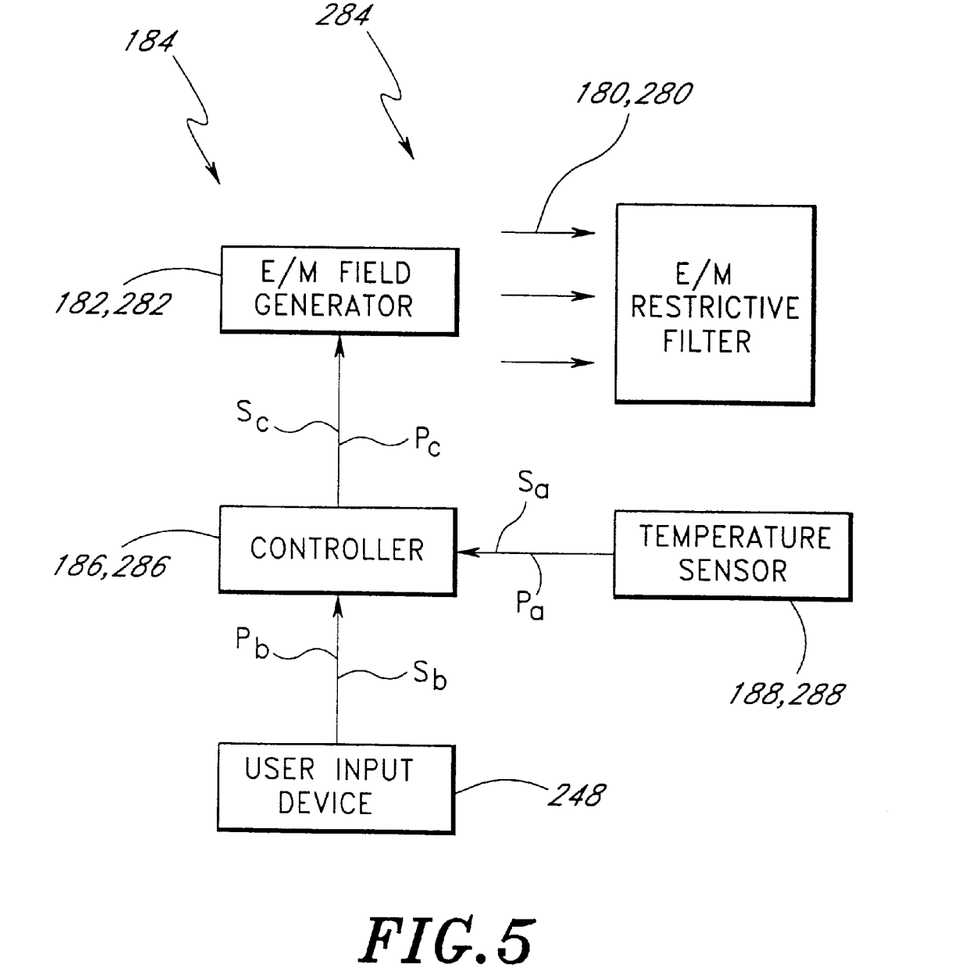
FIG. 5 is a block diagram which schematically illustrates the control system of the filter assembly of FIG. 4.

Reference will now be made to the block diagram of FIG. 5 which generally illustrates the control systems 184 and 284 of the actively controlled optical apparatus 130 and 230 of FIGS. 2 and 4. As shown in FIG. 5, the controller 186, 286 is adapted to receive an input signal $S_a$ from the temperature sensor 188, 288 that is indicative of the temperature of the temperature sensor 188, 288. Furthermore, the signal $S_a$ is directed along a communication path $P_a$ that links the temperature sensor 188, 288 with the controller 186, 286.

As shown in FIG. 5, the controller 286 is further adapted to receive a control signal $S_b$ from the user input device 248 which is indicative of the requested filtering characteristics. In particular, the signal $S_b$ is directed along a communication path $P_b$ that links the user input device 248 with the controller 286.

As shown in FIG. 5, the controller 186, 286 is adapted to transmit a control signal $S_c$ to the electric/magnetic field generator 182, 282. In particular, the control signal $S_c$ is transmitted along a communication path $P_c$ that links the controller 186, 286 with the electric/magnetic field generator 182, 282. Furthermore, upon receiving the control signal $S_c$, the electric/magnetic generator 182, 282 generates the electric/magnetic field 180, 280 having a field strength that corresponds to the signal $S_c$.

It will be appreciated that, in the embodiment of FIG. 1A, the effects of the temperature dependent indices of refraction of the thin film layers 60 of the interference filter 46 are substantially reduced by exposing the filter 46 to both the first and second mismatch stresses. In particular, the thermal expansion properties of the holder 34 and the elastic properties of adhesive 70 are chosen so that the second mismatch stress combines with the first mismatch stress to provide improved thermal compensation.

Thus, it will be appreciated that, in one embodiment, the optical apparatus 30 could be formed from a relatively inexpensive and commonly available optical filter having relatively poor thermal compensation. In particular, such a filter, comprised of the substrate 40 and the interference filter 46 deposited on the substrate, could have filtering characteristics that are substantially sensitive to a change in temperature. However, by mounting the optical filter to the holder 34 in the manner described previously in connection with FIGS. 1A and 1B so as to provide the filter 46 with the compensating second mismatch stress, the optical apparatus 30 can be adapted with filtering characteristics that are less sensitive to a change in temperature.

It will also be appreciated that, in another embodiment, the electro/magneto-strictive nature of the interference filter 146, 246 is exploited to provide another degree of freedom in the effort to thermally compensate the filter 146, 246. In particular, the electro/magneto-strictive filter 146 may be prestressed during the manufacturing process. Alternatively, the filter 146, 246 may be actively stressed by continually exposing the filter to a controllable electric/magnetic field. Furthermore, the actively managed electric/magnetic field may be controlled by the controller 186, 286 in communication with the temperature sensor 188, 288.

It will also be appreciated that, in yet another embodiment, the electro/magneto-strictive properties of the filter 246 are exploited to provide variable filtering characteristics. In particular, depending on the signal provided by the user interface 248, the controller 286 directs the electric/ magnetic field generator 282 to produce an electric/magnetic field which provides the filter 246 with the requested filter characteristic.

Although the preferred embodiment of the present invention has shown, described and pointed out the fundamental novel features of the invention as applied to this embodiment, it will be understood that various omissions, substitutions and changes in the form of the detail of the device illustrated may be made by those skilled in the art without departing from the spirit of the present invention. Consequently, the scope of the invention should not be limited to the foregoing description, but should be defined by the appending claims.

What is claimed is:

1. An optical apparatus comprising:
   an optically transmissive substrate;
   a holder; and
   an interference filter deposited on a surface of the substrate and bonded to a surface of the holder, wherein the holder produces a compensating thermal mismatch stress on said filter such that thermally induced variations in a filtering characteristic of the filter are reduced;
   wherein the holder and the filter are bonded together by an adhesive, said adhesive partially isolating the filter from stresses caused by thermally induced dimensional changes of the holder;
   wherein the filter comprises a plurality of layers of material which are either electrostrictive or magnetorestrictive.

2. The apparatus of claim 1, wherein the plurality of layers of the filter are pre-stressed by exposure to an electric or magnetic field.

3. The apparatus of claim 1, additionally comprising a field generator for applying an electric or magnetic field to the plurality of layers.

4. The apparatus of claim 3, wherein the field generator is formed within the holder.

5. The apparatus of claim 3, additionally comprising a controller for controlling the field generator.

6. The apparatus of claim 5, additionally comprising a temperature sensor, the sensor controlling stresses in said plurality of layers in response to a detected temperature change.

7. An optical apparatus comprising:
   an input port for receiving light along a light path;
   an interference filter having a plurality of layers of material that are either electrorestrictive or magnetorestrictive disposed in said path such that light impinges on the plurality of layers; and
   a field generator for applying an electric or magnetic field to the filter.

8. The apparatus of claim 7, further comprising a controller for controlling the field generator.

9. The apparatus of claim 8, wherein the controller is driven to maintain a substantially uniform filter characteristic for the filter over a range of temperatures.

10. The apparatus of claim 8, wherein the controller varies the electric or magnetic field such that the filter characteristic of the filter varies between a first and a second filter characteristic.

11. An optical filter assembly having a spectral performance that is indicative of the ability of the optical filter to selectively filter a preferred range of optical frequencies from an input optical signal, the optical filter assembly comprising:
   an optically transmissive substrate having a first surface and a second surface, wherein the first surface receives the input optical signal;
   a holder having a first surface;
   a thin film subassembly having a plurality of thin films successively deposited on top of each other in a stacked formation, wherein the plurality of thin films include a first thin film that is deposited on the second surface of the optically transmissive substrate and a second thin film that is deposited furthermost away from the first thin film, wherein the optically transmissive substrate exerts a first thermally dependent mismatch stress onto the thin film subassembly, wherein the spectral performance of the optical filter assembly is dependent on the mechanical stresses distributed throughout the thin film subassembly; and
   an adhesive layer that bonds the optically transmissive substrate to the holder, wherein the adhesive layer is flushly interposed between the second thin film of the thin film subassembly and the first surface of the holder, wherein the adhesive layer is formed so as to transfer a second thermally dependent mismatch stress from the holder to the thin film subassembly such that the second mismatch stress combines with the first mismatch stress so as to stabilize the spectral performance of the optical filter in response to a change in temperature.

12. The optical filter assembly of claim 11, wherein the plurality of thin films of the thin film subassembly include a plurality of pre-stressed thin films so as to provide further stabilization of the spectral performance of the optical filter when the optical filter experiences a change in temperature.

13. A method of stabilizing the filtering characteristics of an interference filter experiencing a first thermally dependent stress at a first surface from a substrate, the method comprising:
   applying a second thermally dependent stress to a second surface of the interference filter so as to reduce the deviation of said interference filter from a desired filtering characteristic in response to a change in temperature; and
   creating the second stress mechanically, wherein the step of creating the second stress includes creating the second stress utilizing an electric or magnetic field.

14. The method of claim 13, wherein applying the second stress to a second surface of said interference filter comprises applying the second stress to a second surface of said interference filter which opposes the first surface of said interference filter.

15. The method of claim 14, wherein applying the second stress reduces thermally induced changes in the optical pathlengths of said interference filter.

16. The method of claim 13, wherein applying the second stress comprises applying the second stress so that the second stress counteracts an effect of the first stress.

17. The method of claim 13, wherein applying the second stress comprises mounting the filter onto a holder so that the second stress is a thermal mismatch stress originating from the holder.

18. An optical apparatus comprising:
   an optically transmissive substrate;
   a holder; and
   an interference filter deposited on a surface of the substrate and bonded to a surface of the holder, wherein the substrate and the holder each have different coefficients of thermal expansion selected to apply compensating stresses on the filter over a range of temperatures, wherein the holder and the filter are bonded together by an adhesive which partially isolates the filter from stresses caused by thermally induced dimensional changes in the holder, and wherein the filter comprises a plurality of layers of material which are either electrostrictive or magnetostrictive.

19. A method of stabilizing the filtering characteristics of an interference filter, the method comprising applying plural thermally dependent stresses to the interference filter so as to reduce the deviation of said interference filter from a desired filtering characteristic in response to a change in temperature, wherein applying plural thermally dependent stresses comprises creating at least one stress utilizing an electric or magnetic field.

* * * * *